United States Patent Office 3,562,358

Patented Feb. 9, 1971

1

2

3,562,358

GRAFT POLYMERIZATION OF VINYL HALIDE MONOMERS AND DIENE POLYMERS

Sheldon F. Gelman, Danbury, Conn., assignor to Stauffer Chemical Company, New York, N.Y., a corporation of Delaware No Drawing. Filed Nov. 7, 1967, Ser. No. 681,074

Int. Cl. C08f *15/02*

U.S. Cl. 260—879 26 Claims

ABSTRACT OF THE DISCLOSURE

Vinyl halide polymers which exhibit improved processing characteristics without sacrificing physical properties are prepared by polymerizing vinyl halide monomer in the presence of from about 0.05% to about 0.75% by weight based on the total weight of monomer of a diene polymer having available unsaturation such as polybutadiene, styrene/butadiene copolymer or natural rubber. The monomer is preferably 100% vinyl chloride through minor amounts of other ethylenically unsaturated monomers can also be used.

The present invention is directed to a process for preparing vinyl halide polymers which exhibit improved processing characteristics without sacrificing physical properties. Particularly, the present invention relates to vinyl halide polymers prepared by polymerizing a monomer composition which is predominantly vinyl halide in the presence of from about 0.05% to about 0.75% by weight based on the total weight of monomer in the monomer composition of a polymerizable, organosolvent soluble diene polymer having available unsaturation.

Vinyl halide polymers can be prepared in a wide variety of molecular weights, those of higher molecular weight generally having better physical properties such as hardness than those of lower molecular weight. However, the higher the molecular weight of the polymer, the more difficult it is to process into final products. In milling and extruding, the higher molecular weight polymers require more shear force and/or higher temperature to fluidize the polymer as compared to lower molecular weight materials. The increased shear force and/or the increased temperature increases the internal temperature of the polymer. Since vinyl halide polymers are thermally unstable and degrade in the presence of heat, this increase in internal temperature of the polymer is disadvantageous. Also, the use of increased shear forces requires the input of additional work energy as compared to polymers of lower molecular weight and this additional work energy adds to the cost of processing the polymer.

It has now been unexpectedly found that vinyl halide polymers of medium and high molecular weight can be prepared which exhibit improved fluxing or flowing characteristics without sacrificing physical properties so as to allow for easier processing of the polymer.

In accordance with the present invention, there is provided a process for preparing vinyl halide polymers which exhibit improved processing characteristics without sacrificing physical properties, which process comprises polymerizing in the presence of a free-radical initiator an ethylenically unsaturated monomer composition containing a predominant amount of vinyl halide monomer of the formula:

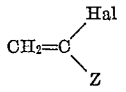

wherein Z is hydrogen or halogen and Hal means halogen, the term halogen as used herein including fluorine, chlorine, bromine and iodine, in the presence of from about 0.05% to about 0.75% by weight based on the total weight of monomer in the monomer composition of a polymerizable, organosolvent soluble diene polymer having available unsaturation. Surprisingly, the polymers formed are thermoplastic polymers of high molecular weight which are characterized by physical properties commensurate with polymers of equal molecular weight formulated by polymerization in the absence of the diene polymer with the additional advantage that the melt flow viscosity under shear of the polymers is decreased so as to provide improved processing characteristics. The decrease in melt flow viscosity under shear allows for the processing of the polymer under thermal conditions which are less conducive to degradation without the sacrifice of physical properties which the polymer is capable of providing.

The exact chemical nature of the polymer which is formed by the process of the present invention is not known. In theory, it is believed that a graft copolymer is formed between the vinyl halide and the diene polymer. The foregoing is theory and applicant is not intended to be bound thereby.

The vinyl halide monomers included within the formula given above that can be used in the present invention include, for example, vinyl fluoride, vinyl chloride, vinyl bromide, vinyl iodide, vinylidene fluoride, vinylidene chloride, vinylidene bromide, vinylidene iodide and the like, though vinyl chloride is preferred. The formula is intended to include all α-halo-substituted ethylenically unsaturated materials which are included within the limits of the formula and which are capable of entering into an addition polymerization reaction. The polymers of the present invention can be formed of the same or different monomer materials falling within the formula and, thus, the invention is intended to cover homopolymers, copolymers, terpolymers, and interpolymers formed by the addition polymerization of the materials falling within the formula. Illustrative of these copolymers is a copolymer of vinyl chloride and vinylidene chloride. The term vinyl halide as used in the claims is intended to include both homo- and copolymers of compounds falling within the given formula.

While it is preferred that the monomer composition be comprised totally of vinyl halide monomer, the present invention is also intended to include copolymers formed by the free-radical addition polymerization of a monomer composition containing a predominant amount, e.g., at least 50% of vinyl halide and a minor amount, e.g., up to 50% by weight of another ethylenically unsaturated monomer material copolymerizable therewith. Preferably, the other ethylenically unsaturated monomer material is used in amounts of less than 25% by weight and more preferably in amounts less than 10% by weight of the total monomer materials used in preparing the polymer. Suitable ethylenically unsaturated monomer materials which can be used to form copolymers, terpolymers, interpolymers and the like are illustrated by the following monoolefinic hydrocarbons, i .e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear or alpha-alkyl or aryl substituted derivatives, e.g., o-, m- or p-methyl, ethyl, propyl or butyl styrene; alphamethyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates; alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyethyl and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, and ethyl alpha-chloroacrylate, methyl alpha-bromoacrylate, ethyl alpha-bromoacrylate, methyl alpha-fluoracrylate, ethyl alpha-fluoracrylate, methyl alpha-iodoacrylate and ethyl alpha-iodoacrylate; alkyl alpha-cyanoacrylates, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl β-chloroethyl sulfide, vinyl β-ethoxyethyl sulfide and the like can also be included. Diolefinically unsaturated hydrocarbons containing two olefinic groups in conjugated relation and the halogen derivatives thereof, e.g., butadiene-1,3; 2-methyl-butadiene-1,3; 2,3-dimethyl-butadiene-1,3; 2-chloro-butadiene-1,3; 2,3-dichloro-butadiene-1,3; and 2-bromo-butadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

The free-radical polymerization of the monomer composition is conducted in the presence of a polymerizable, organosolvent soluble unsaturated diene homopolymer or copolymer. Polymerizable as used herein is intended to indicate the presence of at least 3 carbon to carbon double bond linkages per molecule. These linkages can be in the main molecular chain and in side or pendant chains. The diene polymer must also be organosolvent soluble which is intended to mean solubility in an organic solvent which is compatible with the polymerization reaction or solubility in the monomer used to form the polymer. The molecular weight of the diene polymer can vary anywhere from about 200 to about 100,000, the minimum molecular weight for any polymer system being that which will provide the 3 carbon to carbon double bond linkages per molecule. Preferably, diene polymers having an apparent molecular weight as measured by solution viscosity of below about 20,000, and more preferably below about 5,000 are used. The diene polymer can be liquid or solid as desired. Most preferably, the diene polymer is a low molecular weight liquid material having a molecular weight of between about 1,000 and about 2,000.

The diene polymers include both natural and synthetically prepared polymers having available unsaturation. Preferably, the polymers are formed from open-chain conjugated dienes having from 4 to 8 carbon atoms. Specific examples of diene polymeric materials useful in this invention are natural polymers such as rubber, which is essentially a polymer of isoprene, chlorinated rubber, masticated or oxidized rubber, reclaimed rubber, balata and gutta percha. Synthetic polymers include polybutadiene-1,3, polyisoprene, poly-2,3-dimethylbutadiene-1,3, polychloroprene, and the like; the "synthetic natural" rubbers such as cis-1,4 head-to-tail polyisoprene and other polymers obtained from 1,3-dienes by means of directive polymerization; polypentadiene-1,3, polycyclopentadiene, polyhexadiene-2,4, polyheptadiene-2,4, and the like. A preferred homopolymeric material is the butadiene type polymer, e.g., from a diene having 4 carbon atoms in the main molecular chain and derivatives thereof.

Diene copolymers, terpolymers, interpolymers and other multicomponent diene polymers can also be employed. The term "polymerizable, organosolvent soluble diene polymer" is intended to include not only the homopolymers but also copolymers, terpolymers and interpolymers of dienes with other copolymerizable materials. Preferably, the diene copolymers are butadiene copolymers, e.g., from a diene having 4 carbon atoms in the main molecular chain and derivatives thereof. Copolymeric diene polymers generally contain at least 50% by weight of the diene and preferably from about 55% to about 85% by weight diene. Diene copolymers can be illustrated by GRS rubber, e.g., styrene/butadiene copolymer of a wide variety of proportions though generally of a 25/75 weight percent ratio styrene/butadiene; nitrile rubber, e.g., copolymers of a diene such as butadiene with acrylonitrile illustrated by a 67/33 weight percent ratio butadiene-1,3/acrylonitrile copolymer and butadiene/styrene/acrylonitrile illustrated by a 35/35/30 weight percent ratio butadiene/styrene/acrylonitrile terpolymer; copolymers of isobutylene with monomers such as isoprene and butadiene and illustrated by a 97/3 weight percent ratio isobutylene/isoprene copolymer. Other ethylenically unsaturated monomers which can be utilized to form copolymers are illustrated by vinyl aromatics such as isobutylene, styrene, methyl styrene, chlorostyrene, 2,3-dichlorostyrene, vinyl napthalene, vinyl pyridine, ring-substituted styrenes such as o-, m-, or p-methyl or ethyl styrene and also other polymerizable vinyl carbocyclic and vinyl heterocyclic aromatics; vinyl chloride, vinyl acetate, vinyl propionate, vinylidene chloride, acrylic or methacrylic acids and their lower alkyl esters such as the methyl, ethyl, or butyl esters, ethylenically unsaturated diacids and their anhydrides such as fumaric and maleic and their esters, acrylonitrile, vinyl ethers such as methyl vinyl ether and divinyl ether, monoolefins such as ethylene and propylene, as well as the monomeric forms of the homopolymers listed above such as butadiene, cyclopentadiene, 1,3-pentadiene, isoprene and chloroprene. Preferably, a styrene/butadiene copolymer having a 25/75 weight percent ratio and a molecular weight of between about 1,000 and about 2,000 is used.

The butadiene polymer can be used in an amount of from about 0.05% to about 0.75% by weight based on the total weight of monomer in the monomer composition. Preferably, from about 0.05% to about 0.5% and more preferably from about 0.1% to about 0.4% of the diene polymer is used.

The free-radical polymerization can, in accordance with the method of the present invention, be accomplished using the various conventional methods of polymerization, viz., bulk, or mass, or so-called oil-phase polymerization of vinyl halide; solution polymerization where the vinyl halide is dissolved in a solvent; suspension, or bead, or granular polymerization where the vinyl halide is suspended in the form of large droplets in an aqueous medium generally containing a non-emulsifying suspending agent such as hydroxy methyl cellulose or polyvinyl alcohol; and emulsion polymerization where the vinyl halide is emulsified in water by means of a surface-active emulsifying agent, though suspension polymerization is preferred. Details of these methods of polymerization generally are found in "Unit Processes in Organic Synthesis" by F. H. Groggins, third edition, pages 847–858 (published by McGraw-Hill Book Company, Inc., N.Y., 1947) and details of the methods of polymerizing vinyl halides are found in "Vinyl and Related Polymers" by C. E. Schildknecht, pages 392–398 (published by John Wiley and Sons, Inc., N.Y., 1952). Variations of the conditions of reaction as generally outlined in the art depending on the type of monomer composition, initiator system, and type of polymerization procedure selected are within the purview of the skilled artisan.

For use in suspension polymerization, various suspending agents such as gelatin, hydroxymethyl cellulose, hydroxyethyl cellulose, hydroxypropyl cellulose, carboxymethyl cellulose, talc, clay, polyvinyl alcohol and the like can be used in the method of the present invention. Other suspending agents which are known to be useful in the suspension polymerization of vinyl halides can also be used. The type and amount of the suspending agent used has, as is known, some influence on the particle size of the finally obtained product. The exact amounts of suspending agent and type can be selected by the skilled artisan so as to provide the particle size of product desired. Various other additives, such as thermal stabilizers, and the like, which are normally utilized in the polymerization can also be included. Suspension polymerization techniques are generally preferred in that the polymerization is easier to conduct and the product obtained has a particle size which is more easily handled and used by polymer processors.

Various emulsifying agents which can be used in emulsion polymerization of vinyl halide are illustrated by sodium lauryl sulfate, potassium stearate, alkyl benzene sulfonate, and ammonium dialkyl sulfosuccinate and can be used in the practice of the present invention. Other emulsifying agents which are also known to be useful in emulsion polymerization of vinyl halides can also be used. The exact amounts of the emulsifying agent and a type which is used are easily determined by the skilled artisan. In general, any of the additives such as catalysts and stabilizers, which are normally used in emulsion polymerization of vinyl halides can be utilized in the practice of the present invention. The product obtained from the emulsion polymerization which is in the form of a latex can be utilized per se or the latex can be coagulated to precipitate the polymer particles which can then be dried and processed into any desired form by polymer processor.

The solvents which are used in solution polymerization can be those in which only the monomer is soluble and those in which both the monomer and resulting polymer are soluble, the former solvents being preferred. Illustrative of the monomer soluble, polymer insoluble solvents which can be used in the performance of a solution polymerization of vinyl halides are: pentane, hexane, benzene, toluene and cyclohexane. Illustrative of monomer-polymer solvents which can be used in the solution polymerization of vinyl halides are: cyclohexanone, tetrahydrofuran, dimethyl sulfoxide, and dimethyl formamide. A mixture of solvents can also be used to reduce cost, e.g., as by the use of an expensive solvent diluted with an inexpensive non-solvent or weak solvent. Illustrative of solvent mixtures are: tetrahydrofuran and toluene or petroleum ether. The foregoing solvents and mixtures are given as illustrative and are in no way intended to be inclusive of all the possible solvents and mixtures thereof which can be utilized.

The polymerization of the vinyl halide monomers is a free-radical polymerization reaction and should be conducted in the presence of a free-radical initiator. Useful free-radical initiators are organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Azobisisobutyronitrile is particularly useful in the present invention. The catalyst is used in concentrations ranging from about 0.01 to about 1.0% by weight based on the total weight of the monomers. For use in mass, suspension, and solution polymerization, the catalysts which are soluble in the organic phase, such as benzoyl peroxide, diacetyl peroxide, azobisisobutyronitrile or diisopropyl peroxydicarbonate, azobis ($\alpha$-methyl-$\gamma$-carboxybutyronitrile), caprylyl peroxide, lauroyl peroxide, azobisisobutyramidine hydrochloride, t-butyl peroxypivalate, 2,4-dichlorobenzoyl peroxide, azobis($\alpha$-$\gamma$-dimethylvaleronitrile) are generally used. For use in emulsion polymerization water soluble catalysts such as ammonium persulfate, hydrogen peroxide are used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking. Other known free-radical initiating catalysts, such as light illumination or irradiation with gamma-ray can also be used. Catalysts which tend to cause ionic or coordination polymerization such as the Ziegler-type catalysts can be used in the present invention if organic solvents are used as the reaction medium.

The polymerization of the monomers is conducted at temperatures varying between −80° C. to about 120° C. for varying periods of time depending on the type of monomers utilized and the polymerization technique employed. The choice of a specific reaction temperature is dependent to a large extent on the initiator which is utilized and the rate of polymerization which is desired. Generally, for suspension polymerizations, temperatures of about 40° C. to 70° C. in the persence of an azo type initiator have been found to be effective.

It has also been found that the relative viscosity of the polymer is dependent to some degree on the concentration of the diene polymer and also to the time and temperature of polymerization. The relative viscosity can be increased by increasing the amount of diene polymer which is used. Increases as to time and temperature affect the polymerization rate and effect slight increases in the relative viscosity of the produced polymer. Thus, by varying time, temperature and concentration of the diene polymer, polymers of varying relative viscosities can be obtained and this provides greater latitude in the choice of polymerization conditions. Variation is within the purview of the skilled artisan.

In any of the foregoing polymerization procedures, any other additives which are now commonly utilized can be included within the polymerization mixture. Other procedures such as short-stopping the polymerization at a desired point can also be utilized in accordance with the present invention.

The polymerization products of the present invention can be admixed with various conventional inert additives such as fillers, dyes, and pigments. Also the polymerization products can be admixed with impact modifiers, plastitcizers, lubricants, additional thermal stabilizers, and ultra-violet light stabilizers as desired.

The invention is further illustrated in the examples which follow using as representative of the various polymerization systems, the preferred suspension polymerization system.

EXAMPLES

Suspension polymerization procedure

The following suspension polymerization procedure is used unless otherwise indicated. The reaction mixture or charge is sealed in a one quart soda bottle, the bottle is immersed in a temperature controlled water bath maintained at 58° C. and the polymerization is conducted for 16 hours. The bottles are rotated end over end at 41 revolutions per minute in the bath to provide agitation. The charge consists of the following materials in amounts given in approximate parts by weight:

| Charge: | Parts by weight (dry) |
|---|---|
| Vinyl chloride | 100 |
| Water (deionized) | 233 |
| Suspending agent (hydroxymethylcellulose) | 0.167 |
| Initiator (azobisisobutyronitrile) | 0.2 |
| Diene polymer | 0.2 |

EXAMPLE 1

A polymer is prepared using, as the diene polymer, a viscous, vinyl chloride soluble low molecular weight styrene/butadiene copolymer containing about 25% by weight styrene which has a viscosity average molecular weight of about 1750 as supplied by American Synthetic Rubber Corp., of Louisville, Ky., under the name Flosbrene 25 VLV (−100 mesh). The polymer prepared in accordance with this example has a relative viscosity of 2.44 as measured at 30° C. using a solution of 1 gram of polymer dissolved in 100 grams of cyclohexanone in a Ubbelohde viscosimeter.

EXAMPLE 2

A polymer is prepared using as the diene polymer a 1,2 polybutadiene homopolymer having a molecular weight of between about 1,000 and about 2,000 and containing approximately 80% pendant vinyl groups supplied by Phillips Petroleum under the trade name Butarez HTH.

EXAMPLE 3

A polymer is prepared using as the butadiene polymer a hydroxyl-terminated polybutadiene polymer having a molecular weight of between about 1,000 and about 2,000 and an iodine number of 398 supplied by Sinclair Petrochemicals, Inc. under the trade name Poly B–D R–45M.

The polymerization procedure set forth above operates equally as well to provide the desired final product when other suspending agents, e.g., gelatin, polyvinyl alcohol, hydroxypropyl cellulose, carboxymethyl cellulose, hydroxyethyl cellulose, talc and clay, are used in place of the hydroxymethyl cellulose. Similarly, the azobisisobutyronitrile initiator can be replaced by lauroyl peroxide, diisopropylperoxy dicarbonate, or t-butyl peroxypivalate initiators.

The approximation of actual processing conditions and the determination of the processability of a polymer can be done in a laboratory by means of a fusion torque rheometer. The polymer in powdered form is placed in the instrument and is fused under the influence of heat and shear. The instrument, which is basically a dynamometer, measures the torque force required to maintain mixer rotors revolving at a constant speed while the polymer is being fused. The instrument comprises a heated rotor cavity of measured size having rotors of the Banbury mixer type mounted therein. The rotors are driven by an electric motor suspended between two bearing blocks through which extends the main shaft of the motor. A weighted balance bar is attached to the motor to compensate for the torque force required in operating the rotors. Attached to the balance bar is a weight measuring device which can be read visually and which is provided with a scribe for recording measured weights on a sheet of recording paper. A tachometer and control circuit is used to maintain the number of revolutions of the rotors constant. A circulatory oil temperature control system is used to control the temperature within the rotor cavity. The test comprises inserting a measured amount of polymer in powdered form into the rotor cavity and measuring the resistance torque on the rotors developed by the sample as it begins to melt. This resistance causes the electric motor to swing in a direction opposite the direction of shaft rotation. This swinging motion is transmitted by the balance bar to the weight measuring device which determines the number of meter-grams of reverse force necessary to off-set the swinging motion and hence the torque being applied to the rotors. The torque generally rises from a low point when the sample of polymer is in powdered form to a high point at flux after which the torque subsides to an intermediate equilibrium point or equilibrium torque. The torque remains constant until the polymer degrades whereupon the torque increases due to polymer crosslinking. The equilibrium torque value determines the amount of work in meter-grams which must be applied to the polymer to process the same. The tests are conducted using a 60 cm.$^3$ sample bowl using Banbury type rotors adjusted to operate at 60 revolutions per minute at a temperature of 180° C. The test samples comprise 100 parts by weight of polymer, 3 parts by weight of a stabilizer (Thermolite 31 which is a sulfur-containing organotin compound manufactured by Metal & Thermit Corporation, Rahway, N.J.) and 0.5 part by weight of a lubricant (calcium stearate). Values reported for fusion torque rheology are in meter-grams and are for equilibrium torque.

TABLE I

| | Relative viscosity | Fusion torque rheology in meter-grams |
|---|---|---|
| Product of Example: | | |
| 1 | 2.44 | 2,220 |
| 2 | | 2,400 |
| 3 | | 2,400 |
| Conventional polyvinyl chloride homopolymer: | | |
| 1 | 2.12 | 2,200 |
| 2 | 1.98 | 1,800 |

The relative viscosity data in the table is an indication of molecular weight. Generally, as the relative viscosity increases so does the molecular weight. The product of Example 1, as can be seen from the table, has a higher relative viscosity and therefore a higher molecular weight than the first listed conventional polyvinyl chloride homopolymer. And, generally, as the relative viscosity increases so does the amount of work required to process the polymer. However, and as can be seen from the data in the table, the amounts of work necessary to process the product of Example 1 and the first conventional polyvinyl chloride homopolymer are substantially equal even though the product of Example 1 has a higher relative viscosity than the homopolymer.

The foregoing examples have illustrated the method of the present invention using vinyl chloride as the vinyl halide monomer. Other vinyl halide monomers such as vinyl bromide, vinyl iodide, vinylidene chloride, vinylidene bromide, vinylidene iodide and mixtures thereof can be substituted for the vinyl chloride with equal facility. Vinyl fluoride and vinylidene fluoride which have very low vapor pressures can also be used in high pressure polymerization vessels. As illustrative, 155 parts vinylidene chloride or 90 parts vinyl chloride/15.5 parts vinylidene chloride can be used in place of the 100 parts vinyl chloride with equal facility.

Various copolymers and terpolymers using non-vinyl halide type monomers in combination with the vinyl halide monomer can also be prepared with equal facility. As illustrative, 80 parts vinyl chloride/15.5 parts vinylidene chloride/27.5 parts diethyl fumarate, or 90 parts vinyl chloride/13.75 parts vinyl acetate, or 80 parts vinyl chloride/41.5 parts monomethyl maleate, or 90 parts vinyl chloride/16 parts ethyl acrylate, or 90 parts vinyl chloride/8.5 parts acrylonitrile, or 90 parts vinyl chloride/11.5 parts vinyl ethyl ether can be used in place of the 100 parts vinyl chloride in the preceding examples. Any other non-vinyl halide type monomers such as those listed hereinbefore can be substituted with equal facility to prepare copolymers and terpolymers.

The foregoing examples have illustrated the method of the present invention using polybutadiene homopolymers and styrene/butadiene copolymers. Other diene polymers such as polyisoprene, natural rubber, polychloroprene, and copolymers thereof can also be used with equal facility to prepare polymers in accordance with the method of the invention.

The polymers prepared in accordance with the present invention can be used in applications such as the preparation of calendered film, blow molded bottles, extruded flat bed and blown film, extruded articles, tubing, in injection molding, fluidized bed coating, electrostatic powder spraying, rotational casting, additives to other polymers to increase toughness of the resulting blend or wherever polyvinyl chloride is presently used. It is understood that the polymers of the invention can be compounded with additives usually employed in the coating, impregnating and molding composition arts.

Thus, and in accordance with the present invention, there is provided a method for the preparation of a new class of vinyl halide polymers which exhibit improved processing characteristics, without sacrificing physical properties.

What is claimed is:

1. A method for preparing vinyl halide polymers exhibiting improved processing characteristics without sacrificing physical properties comprising polymerizing in the presence of a free-radical initiator an ethylenically unsaturated monomer composition containing at least 50%, by weight, of a vinyl halide of the formula:

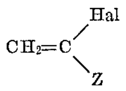

wherein Z is hydrogen or halogen and Hal means halogen, in the presence of from about 0.05% to about 0.75% by weight based on the total weight of monomer in said monomer composition of a polymerizable, organosolvent soluble diene polymer having available unsaturation as the sole polymer modifier.

2. A method as recited in claim 1 wherein said diene polymer is present in an amount of from about 0.05% to about 0.5% by weight.

3. A method as recited in claim 1 wherein said diene polymer is present in an amount of from about 0.1% to about 0.4% by weight.

4. A method as recited in claim 1 wherein said diene polymer has a molecular weight of from about 200 to about 20,000.

5. A method as recited in claim 1 wherein said diene polymer has a molecular weight of from about 200 to about 5,000.

6. A method as recited in claim 1 wherein said diene polymer has a molecular weight of between about 1,000 and about 2,000.

7. A method as recited in claim 1 wherein said diene polymer is a polybutadiene having a molecular weight of from about 200 to about 5,000.

8. A method as recited in claim 1 wherein said diene polymer is a styrene/butadiene copolymer containing about 25% styrene and having a molecular weight of between about 1,000 and about 2,000.

9. A method as recited in claim 1 wherein said diene polymer is polychloroprene.

10. A method as recited in claim 1 wherein said diene polymer is a butadiene/acrylonitrile copolymer.

11. A method as recited in claim 1 wherein said monomer composition consists of 100% vinyl halide.

12. A method as recited in claim 11 wherein said vinyl halide is vinyl chloride.

13. A method as recited in claim 1 wherein said polymerization is conducted using suspension polymerization techniques.

14. An improved group of vinyl halide polymers which exhibit improved processing characteristics without sacrificing physical properties prepared by the free-radical polymerization of an ethylenically unsaturated monomer composition containing at least 50%, by weight, of a vinyl halide of the formula:

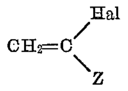

wherein Z is hydrogen or halogen and Hal means halogen, in the presence of from about 0.05% to about 0.75% by weight based on the total weight of monomer in said monomer composition of a polymerizable, organosolvent soluble diene polymer having available unsaturation as the sole polymer modifier.

15. A vinyl halide polymer as recited in claim 14 wherein said monomer composition consists of 100% vinyl halide monomer.

16. A vinyl halide polymer as recited in claim 15 wherein said vinyl halide monomer is vinyl chloride.

17. A vinyl halide polymer as recited in claim 14 wherein said diene polymer is present in an amount of from about 0.05% to about 0.5% by weight.

18. A vinyl halide polymer as recited in claim 14 wherein said diene polymer is present in an amount of from about 0.1% to about 0.4% by weight.

19. A vinyl halide polymer as recited in claim 14 wherein said diene polymer has a molecular weight of from about 200 to about 20,000.

20. A vinyl halide polymer as recited in claim 14 wherein said diene polymer has a molecular weight of from about 200 to about 5,000.

21. A vinyl halide polymer as recited in claim 14 wherein said diene polymer has a molecular weight of between about 1,000 and about 2,000.

22. A vinyl halide polymer as recited in claim 14 wherein said diene polymer is a polybutadiene having a molecular weight of from about 200 to about 5,000.

23. A vinyl halide polymer as recited in claim 14 wherein said diene polymer is a styrene/butadiene copolymer containing about 25% styrene and having a molecular weight of between about 1,000 and about 2,000.

24. A vinyl halide polymer as recited in claim 14 wherein said diene polymer is polychloroprene.

25. A vinyl halide polymer as recited in claim 14 wherein said diene polymer is a butadiene/acrylonitrile copolymer.

26. A vinyl halide polymer as recited in claim 14 wherein said polymerization is conducted using suspension polymerization techniques.

References Cited

UNITED STATES PATENTS 3,119,786 1/1964 Christen et al. ______ 260—45.5
3,240,843 3/1966 Nelson ____________ 260—879

FOREIGN PATENTS 710,894 6/1965 Canada ___________ 260—879

JOSEPH L. SCHOFER, Primary Examiner
R. A. GAITHER, Assistant Examiner